(12) United States Patent
Fabjanski (10) Patent No.: US 12,495,040 B2
(45) Date of Patent: Dec. 9, 2025

(54) USE OF QR CODES IN ONLINE ENCODING (71) Applicant: ASSA ABLOY AB, Stockholm (SE)

(72) Inventor: Krzysztof Grzegorz Fabjanski, Bielsko-Biala (PL)

(73) Assignee: ASSA ABLOY AB, Stockholm (SE)

( * ) Notice: Subject to any disclaimer, the term of this patent is extended or adjusted under 35 U.S.C. 154(b) by 191 days.

(21) Appl. No.: 18/261,584

(22) PCT Filed: Jan. 15, 2021

(86) PCT No.: PCT/EP2021/050824
§ 371 (c)(1),
(2) Date: Jul. 14, 2023

(87) PCT Pub. No.: WO2022/152391
PCT Pub. Date: Jul. 21, 2022

(65) Prior Publication Data
US 2024/0080317 A1    Mar. 7, 2024

(51) Int. Cl.
H04L 29/06 (2006.01)
G06K 19/06 (2006.01)
H04L 9/40 (2022.01)

(52) U.S. Cl.
CPC .... *H04L 63/0853* (2013.01); *G06K 19/06037* (2013.01)

(58) Field of Classification Search
CPC ............ H04L 63/0853; H04L 63/0876; G06K 19/06037
See application file for complete search history.

(56) References Cited

U.S. PATENT DOCUMENTS

| 9,088,457 B1* | 7/2015 | Johnson | G06K 7/1092 |
| 10,200,377 B1* | 2/2019 | Vazquez | H04L 63/102 |
| 2010/0081375 A1* | 4/2010 | Rosenblatt | G08C 23/04 455/41.1 |

(Continued)

FOREIGN PATENT DOCUMENTS

| CN | 116848525 | 10/2023 |
| EP | 3358805 | 8/2018 |

(Continued)

OTHER PUBLICATIONS

"European Application Serial No. 21700751.7, Response Filed Jan. 25, 2024 to Communication pursuant to Rules 161(1) and 162 EPC mailed Aug. 23, 2023", 13 pgs.

(Continued)

*Primary Examiner* — Shawnchoy Rahman
(74) *Attorney, Agent, or Firm* — Schwegman Lundberg & Woessner, P.A.

(57) ABSTRACT

A method of encoding a credential device of an authentication system comprises sending credential device information to a backend server of the authentication system using a mobile device, verifying ownership of the credential device and the mobile device using the backend server, generating, using the backend server, a quick response (QR) code that includes encoding information for the credential device, generating using the backend server a quick response (QR) code that includes encoding information for the credential device, decoding the QR code to retrieve the encoding information, and encoding the credential device with the encoding information.

23 Claims, 4 Drawing Sheets

(56) References Cited

U.S. PATENT DOCUMENTS

| | | | | |
|---|---|---|---|---|
| 2012/0077462 A1* | 3/2012 | Rozensztejn | ....... | H04L 63/0876 |
| | | | | 455/411 |
| 2015/0332031 A1* | 11/2015 | Mistry | .................. | H04W 12/06 |
| | | | | 726/19 |
| 2016/0304054 A1* | 10/2016 | Mansuri | ................ | B60R 25/102 |
| 2018/0068506 A1* | 3/2018 | Lee | ........................ | G07C 9/257 |
| 2018/0109418 A1 | 4/2018 | Cammarota et al. | | |
| 2020/0186366 A1 | 6/2020 | Klink et al. | | |

FOREIGN PATENT DOCUMENTS

| | | |
|---|---|---|
| EP | 3716227 | 9/2020 |
| WO | 2018075135 | 4/2018 |
| WO | 2022152391 | 7/2022 |

OTHER PUBLICATIONS

"International Application Serial No. PCT EP2021 050824, International Search Report mailed Oct. 4, 2021", 5 pgs.

"International Application Serial No. PCT EP2021 050824, Written Opinion mailed Oct. 4, 2021", 6 pgs.

"European Application Serial No. 21700751.7, Communication Pursuant to Article 94(3) EPC mailed May 15, 2025", 4 pgs.

* cited by examiner

USE OF QR CODES IN ONLINE ENCODING

PRIORITY APPLICATION

This application is a U.S. National Stage filing under 35 U.S.C. § 371 of PCT Patent Application No. PCT/EP2021/050824, filed on Jan. 15, 2021, the disclosure of which is incorporated by reference herein in its entirety.

TECHNICAL FIELD

Embodiments illustrated and described herein generally relate to automatic identity authentication systems that authenticate users for access to secure resources, and to techniques of secure messaging for identity authentication systems.

BACKGROUND

There are many applications for automatic authentication of identity of a person using devices. One example is for automatic access to secured areas. Device authentication can involve authentication information being exchanged between a server performing authentication and a credential device such as a smart card or a mobile phone. Devices need logic provided by one or both of hardware and software to perform the functions of authentication. For security reasons, the devices are often manually provisioned or configured (e.g., with software or firmware) to perform the functions described, but this can be costly for large authentication systems. It would be desirable to configure devices for use in automatic authentication using secure remote provisioning.

DETAILED DESCRIPTION

It is desirable for automatic authentication of a person's identity based on verifiable identity information to be fast and secure. Automatic device authentication involves sending sensitive information between devices to prove identity of the holder of a device, or to prove that information is originating from, or being provided to, an authorized device. A credential device presents sensitive credential information to prove identity or authorization and a verifier device authenticates the credential information. Credential devices use one or more of hardware, firmware and software for logic needed to perform the functions of automatic authentication. The devices are typically provisioned manually to perform the credential device functions, but it would be desirable to transfer sensitive information over the air to remotely provision devices for capability in automatic authentication.

However, there are not a lot of options for establishing a secure channel to send sensitive information from the authentication system backend for encoding of the credential device. A dedicated reader/encoder device can be used to receive the sensitive information and encode the credential device, or a smartphone can be used to receive the sensitive information and encode the credential device wirelessly. If it is desired to use a smartphone to encode the credential device, the smartphone uses a special application for communicating with the authentication system backend, and the backend is correlated with the smartphone application. Thus, the smartphone is tightly coupled to the backend server using a strong authentication mechanism for secure communication between the smartphone application and the backend server. An improvement would be to simplify the interaction between the authentication system backend and the smartphone without compromising security.

Figure 1:
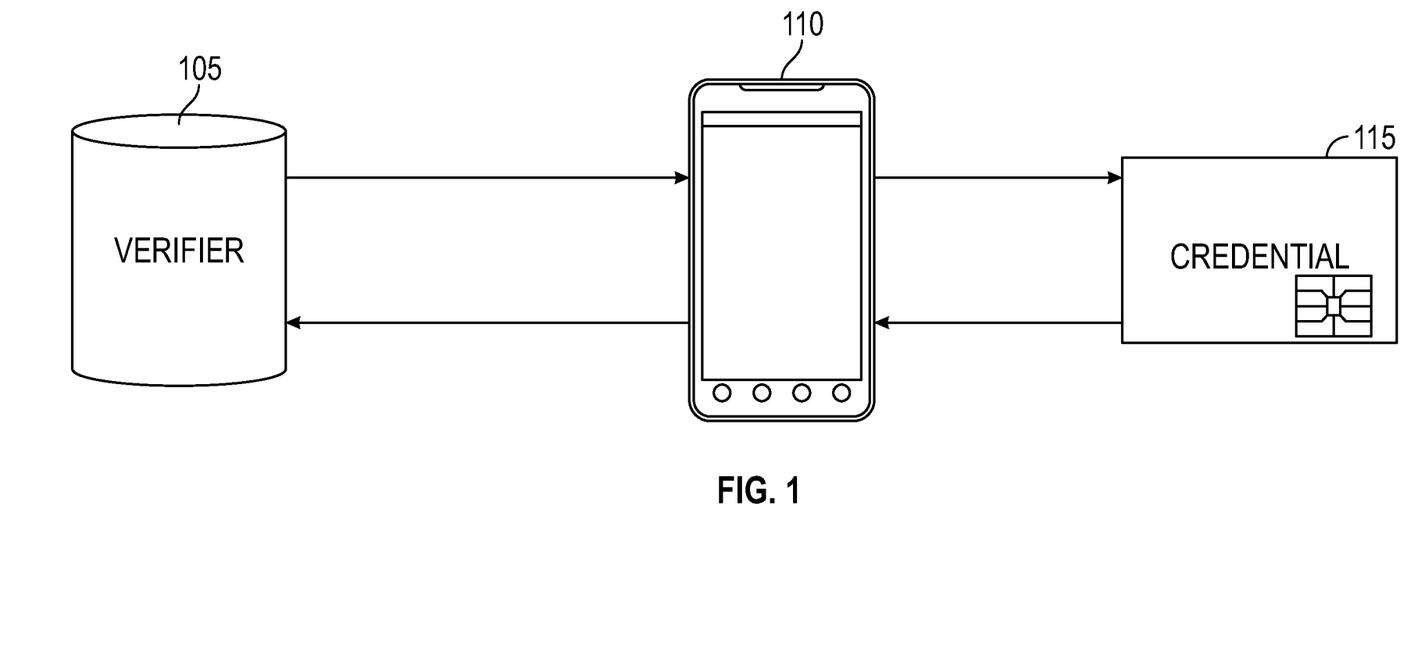
FIG. 1 is an illustration of an example of portions of an authentication system.

FIG. 1 is an illustration of an example of a verifier device 105, a mobile device 110 (e.g., a smartphone), and a credential device 115. The verifier device 105 can be a server of an authentication system backend. The mobile device 110 can be a smartphone, a tablet computer, laptop, or any portable computing device. The credential device 115 can be a smartcard, ICC card, proximity RFID-based cards, key fobs, NFC-enabled devices, smartphones or other mobile devices, personal digital assistants (PDAs), tags, wearable device, or any other suitable device used to authenticate the holder of the device. In the example, it is desired to provision or encode the credential device 115 using the mobile device 110 for capability in automatic authentication. To provide the capability, an authentication software application, or authentication applet is installed in the credential device 115. The authentication application allows any smart device to become a trusted credential device, by performing functions related to, among other things, one or more of mutual authentication, credential verification, encryption key management, and secure messaging.

For example, the authentication application may be installed in the credential device 115 with a credential profile that includes digital credentials. Executing the installed authentication application causes the credential device 115 to provide credential information included in the credential profile to a verifier device of the authentication system, and may cause the credential device to perform mutual authentication with the verifier device.

The authentication application protects access to digital credentials stored in the credential device 115 using cryptographically strong authentication. The authentication application stores digital credentials in application dedicated files (AFDs) that each have a unique object identifier (OID). The authentication application includes a commend set and protocol for the management and retrieval of the digital credentials. The ADFs can be created and destroyed dynamically by the authentication application, optimizing use of the available memory over the lifetime of a digital credential.

Each digital credential is protected through selection and authentication. Protection of the credential information or other sensitive information can involve using multiple encryption keys generated using the authentication application. The authentication application may also generate and authenticate static passwords or one-time passwords.

To avoid the need for a tight coupling between the authentication system backend and the mobile device 110, quick response (QR) encoding is used to hold the information needed by the mobile device 110 to encode the credential device 115. Reading QR codes is a standard application in mobile devices such as smartphones and provides security in that the transfer to the smartphone is optical and the chance of electronic eavesdropping is minimized.

Figure 2:
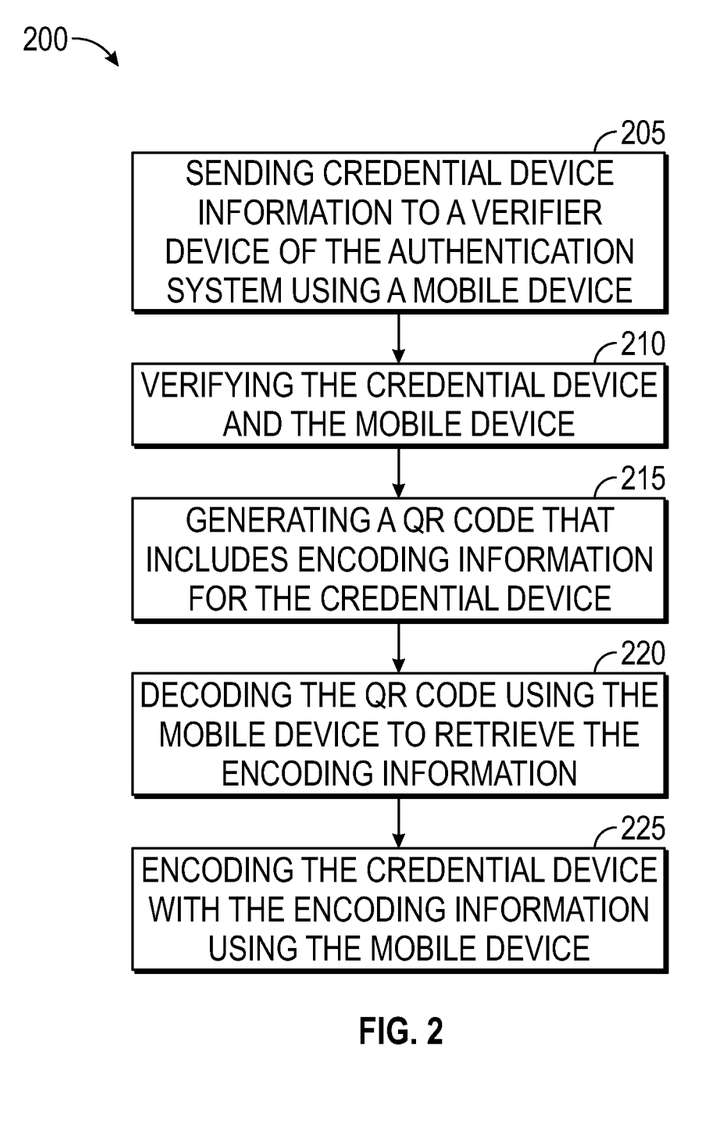
FIG. 2 is a flow diagram of an example of a method of encoding a credential device of an authentication system.

FIG. 2 is a flow diagram of an example of a method 200 of encoding a credential device of an authentication system.

The method 200 can be performed using the devices of the example of FIG. 1. At block 205, information about the credential device is sent to a verifier device of the authentication system backend. The credential device information identifies a type of credential device to encode and may include a serial number of the credential device. In some examples, the mobile device reads the credential device information from a secure element or secure enclave of the credential device using the mobile device. In some examples, the credential device is a smartcard or integrated circuit card (ICC), the mobile device reads Card Production Life Cycle (CPLC) data from the secure element. The CPLC data can include information about the production process of the card like the operating system, the manufacturer, or the serial number of the card.

At block 210, the verifier device verifies the credential device using data about the credential device provided by the mobile device. The data can relate to ownership of the devices and verifying the credential device can be as simple as the holder of the mobile device and credential device logging in to the server and proving ownership of the devices by the login. The application running on the mobile device can be fairly simple and may only need to read out information from the credential device and identify itself and the credential device to the verifier device. In some examples, the verifier device sends a acknowledge message to the mobile device to acknowledge that the credential device information was received and verified and encoding of the credential device can proceed.

At block 215, the verifier device generates a QR code that includes encoded information. The encoded information can be an authentication application or authentication applet readable from a QR code image that enables the credential device to function as a trusted credential of the holder. In some examples, the generated QR code contains encrypted application protocol data units (APDUs).

At block 220, the mobile device decodes the QR code to retrieve the encoded information for provisioning the credential device. In some examples, the verifier device includes the QR code in a webpage. The holder of the mobile device logs into the webpage which may be displayed using the verifier device or may be displayed on a third device the holder logs into, and scans the QR code image (e.g., using a camera of the mobile device) to decode the QR code and obtain the encoding information.

At block 225, the credential device is encoded or provisioned with the encoded information using the mobile device. The encoding may be performed wirelessly using out of band signaling (e.g., out of band from the mobile device's cellular network) such as Bluetooth® Low Energy (BLE) signaling, or near field communications (NFC) signaling. The encoded credential device can then be used as a trusted credential to authenticate the holder to gain access to one or more secured physical or logical resources.

According to some examples, the mobile device and the credential device are the same device. The mobile device notifies the verifier device that the type of device to encode is a mobile device and the encoding will be to provision the mobile device as a credential device. After verifying the mobile device, the verifier generates the QR code. The mobile device scans the QR code and uses the encoded information to provision itself as a credential device. The encoded or provisioned mobile device can then be used as a trusted credential.

In some examples, the credential device scans the QR code from the mobile device. The user logs into the webpage using the mobile device and displays the QR code image. The credential device includes a camera to scan the QR code and encode itself with the encoding information included in the QR code.

Figure 3:
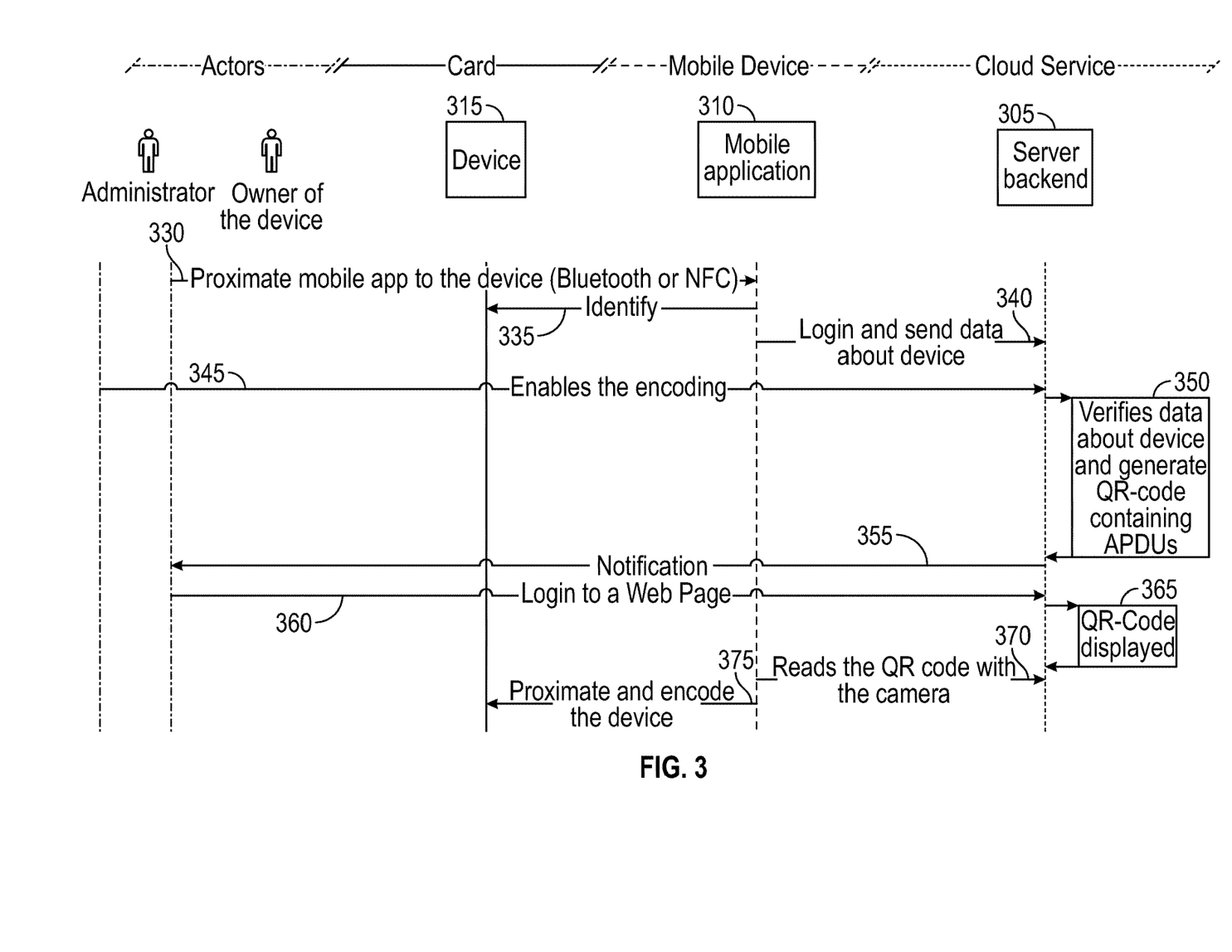
FIG. 3 is a flow diagram of communication among devices of an authentication system.

FIG. 3 is a flow diagram of communication among devices of an authentication system to encode a credential device 315, such as can be a smartcard, ICC card, proximity RFID-based cards, key fobs, NFC-enabled devices, smartphones or other mobile devices, personal digital assistants (PDAs), tags, wearable device, or any other suitable device used to authenticate the holder of the device. At 330, the owner of the credential device holds a mobile device close enough to the credential device 315 for a mobile device application 310 to read the credential device information using out of band signaling. At 335, the mobile application identifies the credential device and at 340, the mobile application logs into the backend server 305 and sends the credential device information to the server using the cellular network of the mobile device, the Internet, or using a cloud service.

A system administrator device may receive an indication of the new credential device 315 from the backend server 305. The system administrator may verify ownership of one or both of the mobile device and the credential device or otherwise confirm that encoding of the credential device is permitted. At 345, the system administrator enables encoding of the credential device, such as by enabling the deployment of encoding information from the backend server for example. At 350, the backend server verifies the received credential device information and generates a QR code that includes APDUs. The QR code may be included in a message payload sent to a third device for displaying the QR code image.

At 355, the backend server sends a notification to the owner (e.g., to the mobile device or to another computing device of the owner). At 360, the owner logs into a webpage using the other device and at 365 the QR code is displayed. At 370, the mobile application reads the QR code using the camera of the mobile device 310. And at 375, the mobile device 310 is held near the credential device and the credential device is encoded by the mobile application 310 (e.g., using out of band signaling).

The systems, devices, and methods described herein provide an encoding channel between a verifier device of an authentication system and a mobile device for encoding credential devices. The encoding channel is secure but does not require a complex authentication mechanism between the verifier device and the mobile device. This simplifies the mobile application needed for the encoding.

Figure 4:
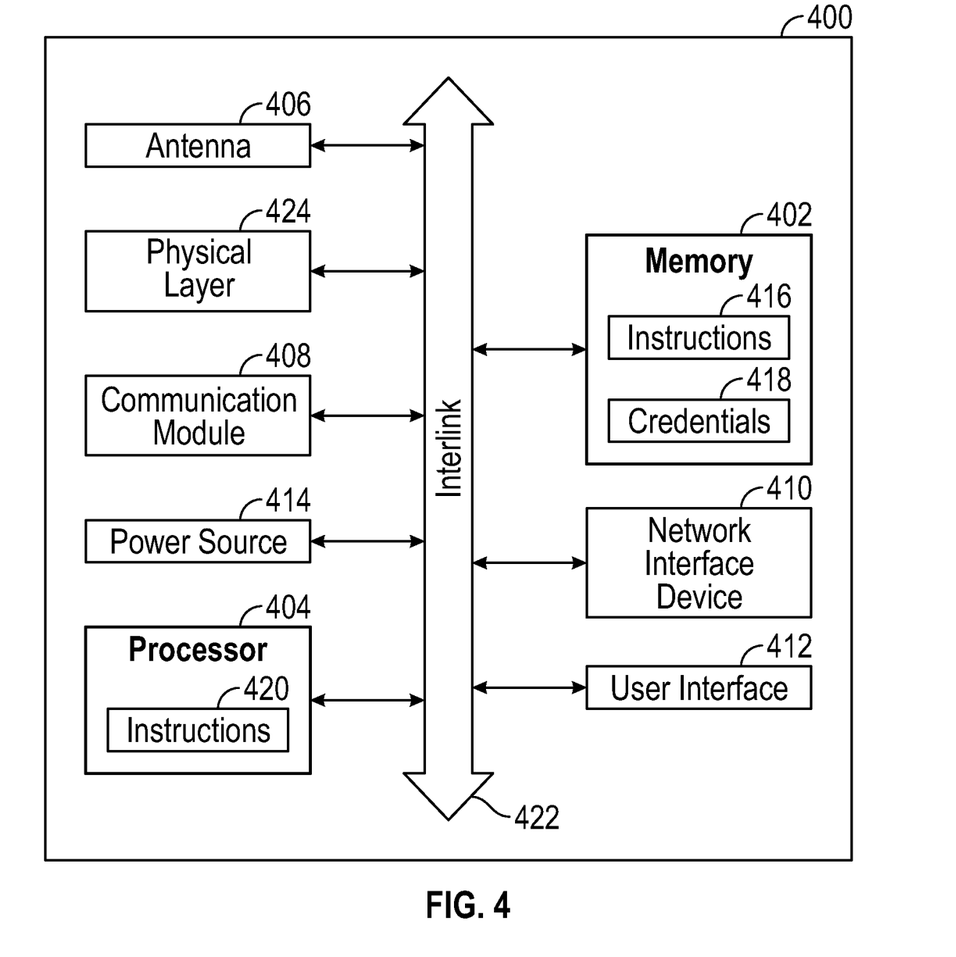
FIG. 4 is a block diagram schematic of portions of an example of a verifier device.

FIG. 4 is a block diagram schematic of various example components of a device 400 (e.g., an embedded device) for supporting the device architectures described and illustrated herein. The device 400 of FIG. 4 could be, for example, a verifier device, mobile device, (or other initiator device) that authenticates credential information of authority, status, rights, and/or entitlement to privileges for the holder of a credential device. The verifier device may be a server of the backend of an authentication system.

With reference specifically to FIG. 4, additional examples of a device 400 for supporting the device architecture described and illustrated herein may generally include one or more of a memory 402, processing circuitry such as processor 404, one or more antennas 406, a communication port or communication module 408, a network interface device 410, a user interface 412, and a power source 414 or power supply.

Memory 402 can be used in connection with the execution of application programming or instructions by processing circuitry, and for the temporary or long-term storage of program instructions or instruction sets 416 and/or authorization data 418, such as credential data, credential authorization data, or access control data or instructions, as well as any data, data structures, and/or computer-executable instructions needed or desired to support the above-described device architecture. For example, memory 402 can contain executable instructions 416 that are used by a processor 404 of the processing circuitry to run other components of device 400, to calculate encryption keys to communicate credential or authorization data 418, and/or to perform any of the functions or operations described herein, such as the method of FIG. 2 for example. Memory 402 can comprise a computer readable medium that can be any medium that can contain, store, communicate, or transport data, program code, or instructions for use by or in connection with device 400. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processing circuitry of the device 400 is configured (e.g., by firmware) to perform the functions of verifier devices or mobile devices described herein, such as the functions of the method of FIG. 2 or FIG. 3 for example. The processing circuitry can correspond to one or more computer processing devices or resources. For instance, processor 404 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 404 can be provided as a microprocessor, Central Processing Unit (CPU), or plurality of microprocessors or CPUs that are configured to execute instructions sets stored in an internal memory 420 and/or memory 402.

Antenna 406 can correspond to one or multiple antennas and can be configured to provide for wireless communications between device 400 and another device. Antenna(s) 406 can be operatively coupled to physical layer circuitry comprising one or more physical (PHY) layers 424 to operate using one or more wireless communication protocols and operating frequencies including, but not limited to, the IEEE 802.15.1, Bluetooth®, Bluetooth® Low Energy (BLE), near field communications (NFC), ZigBee, GSM, CDMA, Wi-Fi, RF, UWB, and the like. In an example, antenna 406 may include one or more antennas coupled to one or more physical layers 424 to operate using ultra-wide band (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 400 may additionally include a communication module 408 and/or network interface device 410. Communication module 408 can be configured to communicate according to any suitable communications protocol with one or more different systems or devices either remote or local to device 400. Network interface device 410 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 410 can include an Ethernet port or other physical jack, a Wi-Fi card, a Network Interface Card (NIC), a cellular interface (e.g., antenna, filters, and associated circuitry), or the like. In some examples, network interface device 410 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 406, communication module 408, and/or network interface device 410 or subcomponents thereof, may be integrated as a single module or device, function or operate as if they were a single module or device, or may comprise of elements that are shared between them.

User interface 412 can include one or more input devices and/or display devices. Examples of suitable user input devices that can be included in user interface 412 include, without limitation, one or more buttons, a keyboard, a mouse, a touch-sensitive surface, a stylus, a camera, a microphone, etc. Examples of suitable user output devices that can be included in user interface 412 include, without limitation, one or more LEDs, an LCD panel, a display screen, a touchscreen, one or more lights, a speaker, etc. It should be appreciated that user interface 412 can also include a combined user input and user output device, such as a touch-sensitive display or the like.

Power source 414 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 400.

Device 400 can also include one or more interlinks or buses 422 operable to transmit communications between the various hardware components of the device. A system bus 422 can be any of several types of commercially available bus structures or bus architectures.

ADDITIONAL DISCLOSURE AND EXAMPLES

Example 1 includes subject matter (such as a method of encoding a credential device of an authentication system) comprising sending credential device information to a backend server of the authentication system using a mobile device; verifying the credential device and the mobile device using the backend server; generating, using the backend server, a quick response (QR) code that includes encoding information for the credential device; decoding the QR code to retrieve the encoding information; and encoding the credential device with the encoding information.

In Example 2, the subject matter of Example 1 optionally includes the credential device being a smart card, and the QR code contains encrypted application protocol data units (APDUs).

In Example 3, the subject matter of one or both of Examples 1 and 2 optionally includes the credential device information identifies a type of credential device to encode and a serial number of the credential device.

In Example 4, the subject matter of one or any combination of Examples 1-3 optionally includes reading the credential device information from a secure element of the credential device using the mobile device.

In Example 5, the subject matter of one or any combination of Examples 1-4 optionally includes displaying a webpage that includes an image of the QR code using a third device, and scanning the webpage using the mobile device to decode the QR code.

In Example 6, the subject matter of Example 5 optionally includes sending an acknowledge message of the credential device to the mobile device, and logging into the webpage that is located at the backend server using the third device.

In Example 7, the subject matter of one or any combination of Examples 1-6 optionally includes the encoding of the credential device including encoding the credential device using out of band signaling.

In Example 8, the subject matter of one or any combination of Examples 1-7 optionally includes enabling the generating of the encoding information by a system administrator device.

In Example 9, the subject matter of Examples 1 or 8 optionally includes the mobile device being the credential device, wherein the decoding the QR code includes the mobile device decoding a QR code for encoding the mobile as the credential device, and the mobile device encoding itself as the credential device using the encoding information.

In Example 10, the subject matter of Examples 1 or 8 optionally includes displaying a webpage that includes an image of the QR code using the mobile device; scanning the webpage using the credential device to decode the QR code; and encoding the credential device with the encoding information.

Example 11 includes subject matter (such as a verifier device) or can optionally be combined with one or any combination of Examples 1-9 to include such subject matter, comprising physical layer circuitry and processing circuitry operatively coupled to the physical layer circuitry. The processing circuitry is configured to decode credential device information included in a message received from a mobile device, verify data about the credential device and the mobile device, and encode a quick response (QR) code that includes encoding information for the credential device.

In Example 12, the subject matter of Example 11 optionally includes the credential device being a smart card, and the processing circuitry is configured to generate a QR code that contains encrypted application protocol data units (APDUs).

In Example 13, the subject matter of one or both of Examples 11 and 12 optionally include processing circuitry configured to decode credential information that includes one or both of a type of the credential device to encode and a serial number of the credential device.

In Example 14, the subject matter of one or any combination of Examples 11-13 optionally includes processing circuitry configured to encode an acknowledge message of verification of the credential device for sending to the mobile device and include the QR code in a web page.

In Example 15, the subject matter of one or any combination of Examples 11-14 optionally includes processing circuitry configured to generate the encoding information in response to an enable encoding message received from a system administrator device.

In Example 16, the subject matter of one or any combination of Examples 11-15 optionally includes the verifier device being a backend server of the authentication system.

Example 17 includes subject matter (or can optionally be combined with one or any combination of Examples 1-16 to include such subject matter) including a computer readable storage medium including instructions that, when performed using processing circuitry of a mobile device, cause the processing circuitry to perform acts comprising encoding credential device information for sending to a backend server of the authentication system, decoding a QR code that includes encoding information for a credential device, and encoding the credential device with the encoding information using the mobile device.

In Example 18, the subject matter of Example 17 optionally includes a computer readable storage medium further containing instructions to cause the processing circuitry to decode a QR code that contains encrypted application protocol data units (APDUs) to encode the credential device.

In Example 19, the subject matter of one or both of Examples 17 and 18 optionally includes a computer readable storage medium further containing instructions to cause the processing circuitry to encode credential device information that identifies a type of credential device to encode and a serial number of the credential device.

In Example 20, the subject matter of one or any combination of Examples 17-19 optionally includes a computer readable storage medium further containing instructions to cause the processing circuitry to initiate a scan of an image of the QR code by a camera of the mobile device, and decode the QR code from the image to obtain the encoding information for the credential device.

In Example 21, the subject matter of one or any combination of Examples 17-20 optionally includes a computer readable storage medium further containing instructions to cause the processing circuitry to initiate out of band signaling by physical layer circuitry of the mobile device, and include the encoding information for the credential device in the out of band signaling.

In Example 22, the subject matter of one or any combination of Examples 17-21 optionally includes the instructions included in an application program of a smartphone.

In Example 23, the subject matter of one or both of Examples 17 and 22 optionally includes a computer readable storage medium further containing instructions to cause the processing circuitry to cause the processing circuitry to decode the QR code include instructions to cause the mobile device to decode a QR code for encoding the mobile device as the credential device, and encode the credential device include instructions to cause the mobile device to encode itself as the credential device using the encoding information.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of encoding a credential device of an authentication system, the method comprising:
sending credential device information to a backend server of the authentication system using a mobile device;
verifying the credential device and the mobile device using the backend server;
generating, using the backend server, a quick response (QR) code that includes encoding information for the credential device;
decoding the QR code to retrieve the encoding information; and
encoding the credential device with the encoding information.

2. The method of claim 1, wherein the credential device is a smart card, and the QR code contains encrypted application protocol data units (APDUs).

3. The method of claim 1, wherein the credential device information identifies a type of credential device to encode and a serial number of the credential device.

4. The method of claim 1, including reading the credential device information from a secure element of the credential device using the mobile device.

5. The method of claim 1, including:
displaying a webpage that includes an image of the QR code using a third device;
scanning the webpage using the mobile device to decode the QR code; and
encoding the credential device with the encoding information using the mobile device.

6. The method of claim 5, including:
sending an acknowledge message of the credential device to the mobile device; and
logging into the webpage that is located at the backend server using the third device.

7. The method of claim 1, wherein the encoding of the credential device includes encoding the credential device using out of band signaling.

8. The method of claim 1, including enabling the generating of the encoding information by a system administrator device.

9. The method of claim 1,
wherein the decoding the QR code includes decoding a QR code for encoding the mobile device as the credential device; and
wherein the encoding the credential device includes the mobile device encoding itself as the credential device using the encoding information.

10. The method of claim 1, including:
displaying a webpage that includes an image of the QR code using the mobile device;
scanning the webpage using the credential device to decode the QR code; and
encoding the credential device with the encoding information.

11. A verifier device of an authentication system, the device comprising:
physical layer circuitry; and
processing circuitry operatively coupled to the physical layer circuitry and configured to:
decode credential device information included in a message received from a mobile device;
verify data about the credential device and the mobile device; and
encode a quick response (QR) code that includes encoding information for encoding the credential device to function as a trusted credential of a holder of the credential device.

12. The verifier device of claim 11, wherein the credential device is a smart card, and the processing circuitry is configured to generate a QR code that contains encrypted application protocol data units (APDUs).

13. The verifier device of claim 11, wherein the processing circuitry is configured to decode credential information that includes one or both of a type of the credential device to encode and a serial number of the credential device.

14. The verifier device of claim 11, wherein the processing circuitry is configured to:
encode an acknowledge message of verification of the credential device for sending to the mobile device; and
include the QR code in a web page.

15. The verifier device of claim 11, wherein the processing circuitry is configured to generate the encoding information in response to an enable encoding message received from a system administrator device.

16. The verifier device of claim 11, wherein the verifier device is a backend server of the authentication system.

17. A non-transitory computer readable storage medium including instructions that, when performed using processing circuitry of a mobile device, cause the processing circuitry to perform acts comprising:
encoding credential device information for sending to a backend server of the authentication system;
decoding a QR code that includes encoding information for a credential device; and
encoding the credential device with the encoding information using the mobile device.

18. The non-transitory computer readable storage medium of claim 17, further including instructions to cause the processing circuitry to decode a QR code that contains encrypted application protocol data units (APDUs) to encode the credential device.

19. The non-transitory computer readable storage medium of claim 17, further including instructions to cause the processing circuitry to encode credential device information that identifies a type of credential device to encode and a serial number of the credential device.

20. The non-transitory computer readable storage medium of claim 17, further including instructions to cause the processing circuitry to:
initiate a scan of an image of the QR code by a camera of the mobile device; and decode the QR code from the image to obtain the encoding information for the credential device.

21. The non-transitory computer readable storage medium of claim 17, further including instructions to cause the processing circuitry to initiate out of band signaling by physical layer circuitry of the mobile device; and include the encoding information for the credential device in the out of band signaling.

22. The non-transitory computer readable storage medium of claim 17, wherein the instructions are included in an application program of a smartphone.

23. The non-transitory computer readable storage medium of claim 17, wherein the instructions to cause the processing circuitry to decode the QR code include instructions to cause the mobile device to decode a QR code for encoding the mobile device as the credential device; and wherein the instructions to cause the processing circuitry to encode the credential device include instructions to cause the mobile device to encode itself as the credential device using the encoding information.

* * * * *